(12) United States Patent
Agostini et al.

(10) Patent No.: US 7,896,633 B2
(45) Date of Patent: Mar. 1, 2011

(54) SELF-RELEASING CURING BLADDER

(75) Inventors: Giorgio Agostini, Grand Duchy (LU); Filomeno Gennaro Corvasce, Mertzig (LU); Massimo Di Giacomo Russo, Grand Duchy (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/879,683

(22) Filed: Jul. 18, 2007

(65) Prior Publication Data

US 2008/0093771 A1  Apr. 24, 2008

Related U.S. Application Data

(60) Provisional application No. 60/852,785, filed on Oct. 19, 2006.

(51) Int. Cl.
*B29D 30/00* (2006.01)
(52) U.S. Cl. ............................................ 425/52; 249/65
(58) Field of Classification Search ................ 264/315; 425/39, 52, 43; 249/65; 156/401
See application file for complete search history.

(56) References Cited

U.S. PATENT DOCUMENTS

| RE25,007 | E | 7/1961 | Tawney et al. | 18/45 |
|---|---|---|---|---|
| 4,533,305 | A | 8/1985 | Comper et al. | 425/43 |
| 4,710,541 | A | 12/1987 | Tomita et al. | 525/104 |
| 4,889,677 | A | 12/1989 | Hashimoto et al. | 264/297 |
| 5,062,781 | A | 11/1991 | Szyms et al. | 425/52 |
| 5,204,384 | A | 4/1993 | Matsushita et al. | 523/211 |
| 5,213,823 | A | 5/1993 | Hunt | 425/521 |
| 5,625,022 | A | 4/1997 | Onishi | 528/15 |
| 6,124,407 | A * | 9/2000 | Lee et al. | 525/478 |
| 6,363,989 | B1 | 4/2002 | Phelps et al. | 156/401 |
| 6,464,923 | B2 | 10/2002 | Tsuji et al. | 264/330 |
| 6,824,724 | B2 | 11/2004 | Mori et al. | 264/315 |
| 6,846,444 | B2 | 1/2005 | Beers et al. | 264/315 |

(Continued)

FOREIGN PATENT DOCUMENTS

EP  0711643 A2  5/1996

(Continued)

OTHER PUBLICATIONS

Derwent Abstract Acc. No. 1993-088243, corresponding to JP-05031724.*

(Continued)

*Primary Examiner*—Christina Johnson
*Assistant Examiner*—Larry Thrower
(74) *Attorney, Agent, or Firm*—John D. DeLong

(57) ABSTRACT

This invention relates to an expandable curing bladder for use in curing rubber products; the bladder comprising an inner layer and an outer layer bonded to the first layer;
  the inner layer comprising a rubber composition comprised of, based on parts weight per 100 parts by weight rubber (phr): an isobutylene copolymer rubber selected from butyl rubber and/or halobutyl rubber,
  wherein said butyl rubber comprises a copolymer of isobutylene and isoprene which contains from about 0.5 to about 5 weight percent units derived from isoprene;
  wherein said halobutyl rubber is a halogenated butyl rubber comprises a chlorinated or brominated copolymer of isobutylene and isoprene which contains from about 0.5 to about 5 weight percent units derived from isoprene; and
  the outer layer comprising a rubber composition comprising a silicon rubber.

6 Claims, 1 Drawing Sheet

U.S. PATENT DOCUMENTS 6,998,088 B2 2/2006 Beers et al. .................. 264/315
2005/0112223 A1* 5/2005 Beers et al. ................... 425/52

FOREIGN PATENT DOCUMENTS

EP          0711643 A3      5/1996
GB          2087914 A       6/1982
JP          05031724    *   2/1993
WO          WO2005042243 *  5/2005

OTHER PUBLICATIONS

Date of Completion—European Search Report—Jan. 17, 2008.
Product Information Sheet, Silicon Rubber Compound, "Silastic® EHP50MFG100 Red3016," by Dow Corning.
P. 4, Product Information Sheet, "Silastic® Silicone Rubber Selection Guide," by Dow Corning.
Pp. 1-6, Product Safety Data Sheet, "Silastic® EHP50MFG100 Red3016," by Dow Corning.

* cited by examiner

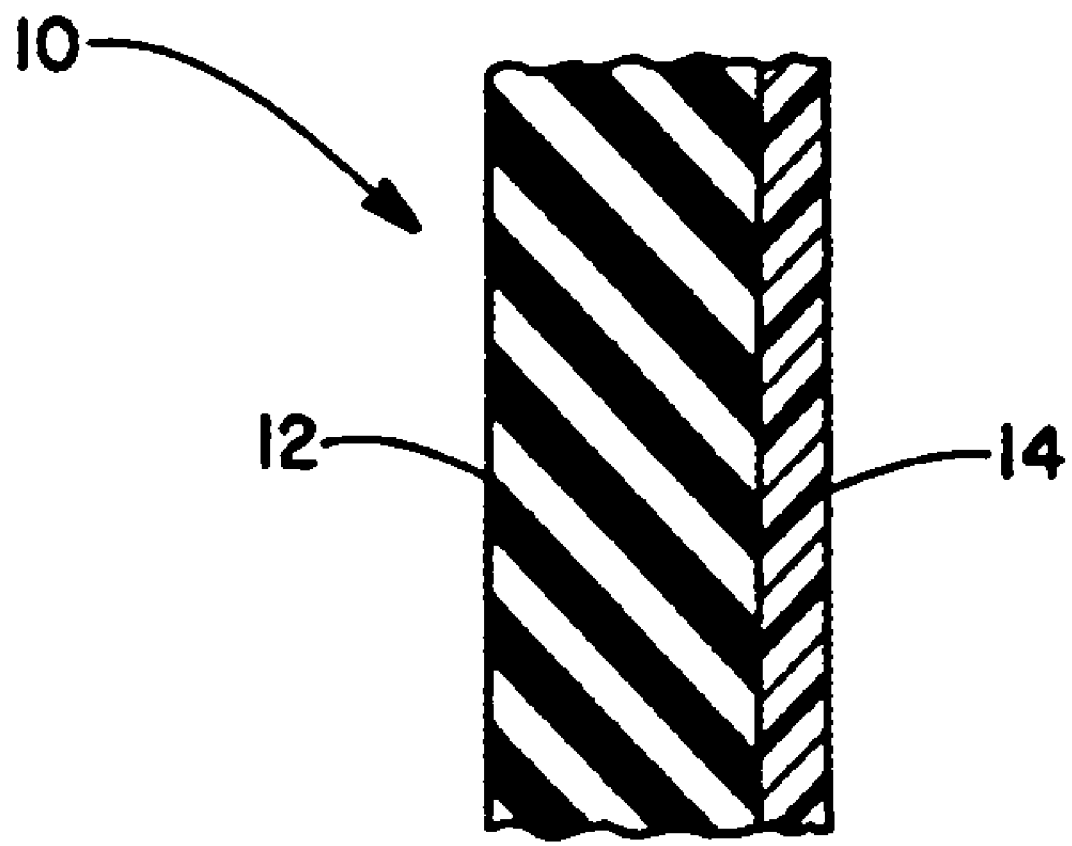

SELF-RELEASING CURING BLADDER

CROSS REFERENCE TO OTHER APPLICATIONS

This application claims the benefit of Ser. No. 60/852,785 filed Oct. 19, 2006.

BACKGROUND OF THE INVENTION

Pneumatic tires are conventionally manufactured by use of an expandable butyl rubber based bladder. For example, a green, uncured, tire is placed in a tire curing mold where the tire is cured, or vulcanized, under conditions of elevated temperature and pressure. In the mold, the open toroidal shaped tire is pressed out against the mold by an expandable butyl rubber based bladder via internal pressure administered to the bladder such by steam, etc. Such tire manufacture and use of expandable butyl rubber bladders for such purpose is well known to those having skill in such art.

It is important for the interfacial surface of the expandable tire curing bladder of a butyl rubber composition to have adequate interfacial lubricity and sufficiently low adhesion properties between the bladder surface and the inner surface of the tire being vulcanized in the mold.

Conventionally, the butyl rubber composition for a tire curing bladder contains castor oil as an internal lubricant which is intended to bleed (migrate) to the outer surface of the bladder to promote a continuing lubricity at the interface between the bladder surface and inner surface of the tire being cured. For example, see U.S. Pat. No. 3,031,423.

Use of corn oil as an internal tire cure butyl rubber bladder lubricant for a similar purpose has also been proposed. See U.S. Pat. No. 5,580,513.

Graphite as a lubricant (see U.S. Pat. No. 5,538,218) and polytetrafluoroethylene powder as a lubricant (see U.S. Pat. No. 5,728,311) have also been proposed for use in a butyl rubber tire curing bladder.

Even with an internal lubricant (a lubricant contained in the butyl rubber composition designed to bleed to the surface of the bladder) such as castor oil or corn oil, it is often desired to externally apply a polysiloxane based lubricant to the outer bladder surface as to enhance the interfacial lubrication between the bladder and tire surfaces, a practice which is well known to those skilled in such art.

Thus, from an historical perspective, pneumatic rubber vehicle tires are produced by molding and curing green (uncured) and unshaped tires in a molding press. The green tire is pressed outwardly against a mold surface by means of an inner fluid-expandable bladder. By this method, the green tire is shaped against the outer mold surface which defines the tire tread pattern and configuration of the sidewalls. By application of heat (elevated temperature) and pressure, the tire is molded and cured.

Historically, the expansion of the bladder is accomplished by application of internal pressure to the inner bladder cavity. The pressure is provided by a fluid such as gas, hot water and/or steam, which also participates in the transfer of heat for the curing or vulcanization of the tire. The tire is then conventionally allowed to cool somewhat in the mold, sometimes aided by adding cold or cooler water to the bladder. Then the mold is opened, the bladder is collapsed by removal of its internal fluid pressure and the tire is removed from the tire mold. Such use of tire curing bladders is well known to those having skill in such art.

By such practice, it is recognized that there is substantial relative movement at the interface between the outer contacting surface of the bladder and the inner surface of the tire during the expansion phase of the bladder. Likewise, there is considerable relative movement between the outer contacting surface of the bladder and the cured inner surface of the tire during the collapse and the stripping of the bladder from the tire after the tire has been molded and vulcanized.

By such practice, it is recognized that the bladder surface can tend to stick to a tire's inner surface after the tire is cured and during the bladder collapsing part of the tire cure cycle. This adhesion may cause roughening of the bladder surface if it is not controlled. This typically reduces bladder durability and can produce defective tires.

Accordingly, it is often desired to pre-coat the bladder surface, and/or to pre-coat the inner surface of the green tires with a lubricant which can also transfer to the bladder surface and, thereby, provide a degree of interfacial lubricity between the outer bladder surface and inner tire surfaces during the tire's molding and curing operation. Such externally applied lubricant has sometimes been referred to as a "bladder lubricant," and can be of numerous formulations. A silicone polymer (e.g., a lubricant comprised of a polysiloxane such as for example a polydimethylsiloxane) is often used as an externally applied bladder lubricant.

It is to be appreciated that the release of the tire from its curing bladder in an industrial manufacturing setting is intimately associated with both the phenomenon of release (to prevent sticking) and the phenomenon of lubrication (to enhance slipping) between the bladder surface and the inner tire surface. The release aspect refers to the basic ability to avoid adhesion, or enhance release, between the bladder surface and inner tire surface and the aspect of lubrication relates to enhancing the ability of the surfaces to slip and enable a movement of the bladder with respect to the tire as the tire is shaped within the mold.

Expandable tire curing bladders are commonly of a butyl rubber composition. Butyl rubber is a copolymer of predominantly isobutylene with small amounts of diene monomers, usually isoprene, to give sufficient unsaturation to allow the butyl rubber to be crosslinked. Halogenated copolymers of isobutylene and para-methylstyrene are also sometimes used such as for example, chlorobutyl rubber and bromobutyl rubber and brominated copolymers of ethylene and paramethyl styrene. Accordingly, it is desired to provide expandable butyl rubber curing bladders with acceptable lubricity and decreased adhesion of the bladder to the tire surface against which the bladder expands.

In the description of this invention, the term "phr" is sometimes used to refer to "parts by weight of an ingredient per hundred parts by weight of rubber" for various ingredients in a rubber composition.

The terms "compound," "compounded rubber" and "rubber composition" are intended to be interchangeable terms unless otherwise indicated. The terms "cure" and "vulcanize" are intended to be interchangeable terms unless otherwise indicated. The terms "green" and "uncured" are intended to be interchangeable unless otherwise indicated.

SUMMARY OF THE INVENTION

The present invention is directed to an expandable curing bladder for use in curing rubber products; the bladder comprising an inner layer and an outer layer bonded to the first layer;

the inner layer comprising a rubber composition comprised of, based on parts weight per 100 parts by weight rubber (phr):
an isobutylene copolymer rubber selected from butyl rubber and/or halobutyl rubber, wherein said butyl rubber comprises a copolymer of isobutylene and isoprene which contains from about 0.5 to about 5 weight percent units derived from isoprene;

wherein said halobutyl rubber is a halogenated butyl rubber comprises a chlorinated or brominated copolymer of isobutylene and isoprene which contains from about 0.5 to about 5 weight percent units derived from isoprene; and the outer layer comprising a rubber composition comprising a silicon rubber.

The present invention further comprises a curing press (e.g. tire curing press) comprised of a mold which contains said expandable curing bladder to assist in shaping and curing an uncured rubber product (e.g. an uncured toroidally shaped pneumatic rubber tire).

The present invention additionally provides a process of using said curing bladder to shape and cure an uncured toroidally shaped pneumatic tire.

DETAILED DESCRIPTION

Referring now to the sole FIGURE of drawing, 10 shows an expandable curing bladder used in tire making, which has a butyl rubber base or core 12 and a high release silicone rubber outside layer 14 bonded thereto. This high release silicone rubber outside layer 14 is made of a high release material in accordance with this invention. The outside layer 14 may be directly bonded to the base or core 12.

The base 12 is resin-cured butyl rubber composition, as further described herein. The base layer 12 should be elastomeric, should be capable of repeated inflation and deflation with good resistance to flex crack and virtually 100% return to original dimensions, and of good resistance to permeation by inflation gases.

The outer surface layer 14 is formed of a material having high elongation at break, satisfactory 100% modulus, good release properties, and high cut resistance. This is achieved by providing, as the material of the outside layer 14, a cured elastomeric composition which is a silicone rubber composition as further described herein.

The material forming outer layer 14 of the curing bladder can be calendered and applied as a thin laminate to the base rubber 12 of the curing bladder 10 by conventional means and cured in a conventional manner. The thickness of the outer layer 14 after curing is from about 0.01 to about 0.1 inch (about 0.025 to about 0.25 cm). In a preferred embodiment of this invention, bladder 10 described herein forms a curing bladder in a tire curing apparatus, such as those described in U.S. Pat. Nos. 4,606,714 and 6,955,782. In fact, the composite rubber article 10 shown herein is generally useful as a material for rubber articles which are subjected to repeated flexure and which therefore must have high durability and fatigue resistance, and which also should have an outer surface or outer layer that has good release properties when in contact with cured rubber.

It is possible to form the entire bladder 10, and not just the outer surface layer of the silicone rubber composition. This is not preferred, however, since the laminate structure shown in the drawing possess the desirable physical qualities of the base rubber (e.g., high elongation, comparatively low modulus, high permeation resistance) and the desirable qualities, such as low adhesion to cured rubber and good durability which are imparted by the silicone rubber layer 14.

In accordance with this invention, there is provided an expandable curing bladder for use in curing rubber products; the bladder comprising an inner layer and an outer layer bonded to the first layer;

the inner layer comprising a rubber composition comprised of, based on parts weight per 100 parts by weight rubber (phr): an isobutylene copolymer rubber selected from butyl rubber and/or halobutyl rubber, wherein said butyl rubber comprises a copolymer of isobutylene and isoprene which contains from about 0.5 to about 5 weight percent units derived from isoprene;

wherein said halobutyl rubber is a halogenated butyl rubber comprises a chlorinated or brominated copolymer of isobutylene and isoprene which contains from about 0.5 to about 5 weight percent units derived from isoprene; and the outer layer comprising a rubber composition comprising a silicon rubber.

As hereinbefore discussed, the present invention is further directed to a curing press for curing an uncured toroidally shaped pneumatic rubber tire which contains said expandable curing bladder to assist shaping and curing said pneumatic tire.

As hereinbefore discussed, the present invention is additionally directed to a process of using said expandable curing bladder to shape and cure a pneumatic tire which comprises:

(A) inserting an uncured toroidally shaped pneumatic rubber tire into a curing mold having said expandable curing bladder positioned therein;

(B) closing said curing mold and inflating said expandable curing bladder to expand said expandable curing bladder outwardly against an inner surface of said uncured pneumatic rubber tire to force said uncured pneumatic tire against a mold surface of said curing mold;

(C) curing said uncured pneumatic rubber tire in said curing mold at an elevated temperature in a range of about 140° C. to about 180° C.;

(D) deflating said expandable curing bladder; and (E) removing the resultant cured pneumatic rubber tire from the curing mold and expandable curing bladder.

In one embodiment, the silicone rubber for the outer layer of the expandable bladder is formed from a composition generally comprising an organopolysiloxane containing at least 2 silicon-bonded alkenyl groups per molecule, an organohydrogenpolysiloxane having at least 2 silicon-bonded hydrogen atoms in each molecule, an inorganic filler such as silica or the like, and a hydrosilylation catalyst. An adhesion promoter may be added to the composition to promote adhesion of the silicone rubber outer layer to the butyl rubber inner layer. A curing inhibitor may be included in the composition to slow the curing rate and increase the pot life of the composition. Details of such silicone rubber compositions are given for example in U.S. Pat. Nos. 5,204,384; 6,124,407; and 6,464,923.

Suitable hydrosilylation catalysts include any of the known platinum, rhodium ruthenium, palladium osmium and iridium hydrosilylation catalysts. In one embodiment, the hydrosilylation catalyst is a platinum catalyst. In one embodiment, the hydrosilylation catalyst is selected from finely divided platinum metal, platinum black, chloroplatinic acid, alcohol-modified chloroplatinic acid, chloroplatinic acid/olefin complexes, chloroplatinic acid/diketone complexes, and chloroplatinic acid/divinyltetramethyldisiloxane complexes, as well as thermoplastic resin powders comprising such platinum catalysts.

Suitable adhesion promoters include those disclosed in U.S. Pat. No. 6,124,407 fully incorporated herein by reference. As disclosed therein, suitable adhesion promoters may comprise (i) a polysiloxane having an average of at least one silicon-bonded alkenyl group and an average of at least one silicon-bonded hydroxyl group per molecule, or (ii) an epoxy-containing polysiloxane.

Suitable curing inhibitors include those disclosed in U.S. Pat. No. 6,464,923, fully incorporated herein by reference. As disclosed therein, suitable curing inhibitors include alkyne alcohols such as 3-methyl-1-buten-3-ol, 3,5-dimethyl-1-hexyn-3-ol, 1-ethinyl-1-cyclohexanol, phenylbutynol; -enine compounds such as 3-methyl-3-penten-1-ine and 3,5-dimethyl-3-hexen-1-ine; vinyl group-containing organosiloxane oligomers such as 1,3,5,7-tetramethyl-1,3,5,7-tetravinylcyclotetrasiloxane and 1,3,5,7-tetramethyl-1,3,5,7-tetrahexenylcyclotetrasiloxane; and nitrogenous compounds such as benzotriazole and tetramethylethylenediamine, as well as mixtures thereof.

In one embodiment, the silicone rubber is Silastic® EHP50MFG00 Red3016 available commercially from Dow Corning.

In one embodiment, the silicone rubber composition is cured at a temperature ranging from about 70 to about 200° C. In another embodiment, the composition is cured at a temperature ranging from about 100 to 150° C.

Conventional preferred butyl rubbers for use in this invention are typically copolymers of isobutyiene and a minor amount of a conjugated diene such as, for example, isoprene. Desirably, the isoprene component is from about 0.1 to about 5, alternately from about 0.5 to about 5, weight percent of units of the isobutylene copolymer rubber derived from isoprene, with the remainder being derived from the isobutylene.

An alternative butyl rubber for the curing bladder, although less preferable, is comprised of a brominated copolymer of isobutylene and paramethyl styrene. The brominated copolymer conventionally contains from about 0.3 to about 2 weight percent bromination. Exemplary of such a brominated copolymer is EXXPRO® from ExxonMobil Chemical reportedly having a Mooney (ML 1+8) viscosity at 125° C. of from about 45 to about 55, a para-methylstyrene content of about 5 weight percent, isobutylene content of about 94 to about 95 weight percent, and a bromine content of about 0.8 weight percent A European patent application having Publication No. 0,344,021 describes how to make such copolymers. Alternately, the butyl rubber may be comprised of a combination of a copolymer of isobutylene and isoprene together with a brominated copolymer of isobutylene and paramethyl styrene.

It is to be appreciated that the butyl rubber composition for the curing bladder (e.g. tire curing bladder) is resin-cured instead of sulfur-cured, which is a conventional practice for butyl rubber-based curing bladders which are used for rubber products composed of diene-based elastomers. As hereinbefore mentioned, the resin curatives are conventionally composed of a small amount of polychloroprene rubber, which is sometimes referred to as a "chloroprene rubber" and acts as a chlorine source, and a phenol-formaldehyde resin. Such resin cure system for butyl rubber is well known to those having skill in such art.

In one embodiment, the resin cured butyl rubber for the inner layer of the expandable bladder is cured with at least one curative including from about 0.5 to about 12 phr of a halogenated or non-halogenated phenolic resin curative for crosslinking the isobutylene copolymer rubber (the butyl rubber or halobutyl rubber). The curative is not a sulfur-based curative. Cure bladders for diene-based rubber products (e.g. tires) do not contain sulfur curatives so that curing is not thereby promoted between the surface of the rubber product and the bladder as would be understood by one having skill in the pertinent art.

In one embodiment, the curative is a combination of polychloroprene rubber and phenol-formaldehyde resin.

In practice, the polychloroprene rubber co-curative is conventionally counted toward the 100 parts by weight rubber of the butyl rubber composition even though it has a separate function as a halogen containing elastomer. It may be included in amounts, for example, of up to 10 or even 15 weight percent of the butyl rubber when a halogen source is desirable to activate the resin cure system. In an exemplary embodiment, the butyl rubber composition comprises about 1 to about 10 phr of polychloroprene rubber, such as Neoprene® from DuPont.

Resins for curing the butyl rubber-based rubber composition of the curing bladder may be used in amounts, for example, of from about 1 to about 12 phr and include conventional phenol-formaldehyde resins. Such cure systems for bladder compositions are well known to those having skill in the art. For an example, see U.S. Pat. Nos. 3,031,423 and 5,728,311.

The cured butyl rubber-based rubber composition for the curing bladder may also contain conventional additives including fillers, stearic acid, resin for curing, antiozonants, antioxidants, processing oils, activators, initiators, plasticizers, waxes, extender oils and the like.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Antidegradants include antioxidants and antiozonants. Amounts used may be, for example, from about 0.1 to about 10 phr, although more typically about 2 to about 5 phr. Antiozonants are compounds that prevent chain scission due to exposure to ozone. They are also well known to the art. Antidegradants include monophenols, bisphenols, thiophenols, polyphenols, hydroquinone derivatives, phosphites, phosphate blends, thioesters, naphthylamines, diphenol amines as well as other diaryl amine derivatives, paraphenylenes, diamines, quinolines, and blended amines.

Various fillers are often incorporated into the curing bladder compositions. They may be used, for example, in amounts in a range of from about 20 to about 80 phr. A preferred filler is carbon black. Elastomer reinforcing type fillers are preferred for use in curing bladders. Silica may be used in a very minor amount in addition to the carbon black, if desired. Silicas are generally described as synthetic, amorphous silicas, particularly precipitated silicas. Fillers include reinforcing fillers such as carbon black which can be used, for example, in amounts from about 25 to about 75 phr. Typical carbon blacks that can be used include, for example, according to standard ASTM designations, acetylene black (e.g., N990), N110, N121, N220, N231, N234, N242, N293, N299, N326, N330, N332, N339, N343, N347, N351, N358, N375, N472, N539, N550, N683, N754, and N765, although acetylene black and N347 and/or N220 carbon blacks are usually preferred. Acetylene-derived carbon blacks typically have a higher thermal conductivity than more conventional rubber reinforcing carbon blacks and therefore typically constitute a major amount, and may sometimes constitute the total amount, of the carbon black reinforcement for the curing bladder composition.

Various oils and waxes may be used in the curing bladder butyl rubber-based composition depending upon the compatibility of such oils and waxes with the butyl rubber and the other components of the rubber formulation. They may be uniformly dispersed or they may desirably tend to phase separate (migrate to the surface) from the composition.

Waxes include microcrystalline wax and paraffin wax. Oils include aliphatic-naphthenic aromatic resins, polyethylene glycol, petroleum oils, ester plasticizers, vulcanized vegetable oils, phenolic resin, polymeric esters and rosins. Waxes can be used in conventional individual amounts of, for example, from about 1 to about 5 or even up to about 10 phr. They are usually considered plasticizers and modulus modifiers. Fatty acids such as stearic acid, palmitic acid and oleic acid may be used in amounts of 0.1 to about 7 phr with a range of about 0.2 to about 6 phr sometimes being more preferred. Zinc oxide may be present, for example, in amounts of about 2 to about 15 phr.

The butyl rubber composition for the tire cure bladder may be prepared, for example by mixing, in an internal rubber mixer, sometimes referred to as a first, or non-productive mixing stage, the rubber, micro-encapsulated lubricant, and ingredients such as for example, wax, and zinc oxide, until the mix temperature reaches a temperature in a range of from, for example, 140° C. to about 200° C., alternatively from 150° C. to about 180° C. The material is dumped from the rubber mixer and milled on an open roll mill, sheeted off and cooled to a temperature below 40° C. The cooled rubber composition is added to an internal rubber mixer in a second mixing stage. In the second mixing stage (the productive stage), the curatives (including any neoprene rubber, resin, preferably brominated phenolic resin, and zinc oxide) are added and mixed until the mix temperature reaches, for example, about 110 to about 120° C. The material is then dumped from the internal rubber mixer and cooled.

The curing bladder may be molded, for example, in an injection molding machine or a transfer molding machine. If transfer molding is selected, the material obtained from the internal rubber mixer is extruded as a slug. A cure rheometer may be used to determine the approximate time to develop optimal cure at specific temperatures. The actual cure time will depend on heating rate and the gauge (thickness) of the curing bladder. The curing bladder desirably will have a toroidal shape. For example, bladder material may be cured for about 20 to about 60 minutes, alternatively from 25 to 40 minutes, at a temperature of from 150° C. to about 205° C., alternatively from 170° C. to about 200° C.

While the curing bladders of this invention are seen as being useful for molding and curing various pneumatic tires other contemplated rubber products cured in such bladder equipped presses include, for example, hoses, various sleeves, and air springs (a shock absorbing spring for commercial vehicles).

While certain representative embodiments and details have been shown for the purpose of illustrating the invention, it will be apparent to those skilled in this art that various changes and modifications may be made therein without departing from the spirit or scope of the invention.

What is claimed is:

1. An expandable curing bladder for use in curing rubber products; the bladder comprising an inner layer and a calendered outer layer bonded to the inner layer, wherein the outer layer has a thickness ranging from about 0.025 to about 0.25 cm, and the inner layer is thicker than the outer layer;
   the inner layer comprising a rubber composition comprised of, based on parts weight per 100 parts by weight rubber (phr): an isobutylene copolymer rubber selected from butyl rubber and/or halobutyl rubber,
   wherein said butyl rubber comprises a copolymer of isobutylene and isoprene which contains from about 0.5 to about 5 weight percent units derived from isoprene;
   wherein said halobutyl rubber is a halogenated butyl rubber comprising a chlorinated or brominated copolymer of isobutylene and isoprene which contains from about 0.5 to about 5 weight percent units derived from isoprene; and
   the outer layer comprising a rubber composition comprising a silicone rubber; wherein said silicone rubber is formed from a composition comprising an organopolysiloxane containing at least 2 silicon-bonded alkenyl groups per molecule, an organohydrogenpolysiloxane having at least 2 silicon-bonded hydrogen atoms in each molecule, an inorganic filler, and a hydrosilylation catalyst.

2. The expandable curing bladder of claim 1 for use in curing pneumatic rubber tires.

3. The expandable curing bladder of claim 1 wherein said catalyst is a platinum-containing hydrosilylation catalyst.

4. A curing press for curing an uncured toroidally shaped pneumatic rubber tire which contains said expandable curing bladder of claim 1 to assist shaping and curing said pneumatic tire.

5. The expandable curing bladder of claim 1, wherein the rubber composition of the outer layer further comprises and adhesion promoter.

6. The expandable curing bladder of claim 5, wherein the adhesion promoter is selected from the group consisting of (i) a polysiloxane having an average of at least one silicon-bonded alkenyl group and an average of at least one silicon-bonded hydroxyl group per molecule, and (ii) an epoxy-containing polysiloxaneis.

* * * * *